United States Patent
Sudano et al.

(10) Patent No.: US 6,933,077 B2
(45) Date of Patent: Aug. 23, 2005

(54) CURRENT COLLECTOR FOR POLYMER ELECTROCHEMICAL CELLS AND ELECTROCHEMICAL GENERATORS THEREOF

(75) Inventors: Anthony Sudano, Laval (CA); Richard Laliberté, Ste-Julie (CA); Martin Simoneau, St-Bruno (CA); Michel Parent, Longueuil (CA)

(73) Assignee: Avestor Limited Partnership, Boucherville (CA)

( * ) Notice: Subject to any disclaimer, the term of this patent is extended or adjusted under 35 U.S.C. 154(b) by 117 days.

(21) Appl. No.: 10/329,364

(22) Filed: Dec. 27, 2002

(65) Prior Publication Data

US 2004/0126663 A1 Jul. 1, 2004

(51) Int. Cl.$^7$ ................................................ H01M 4/66
(52) U.S. Cl. ...................... 429/208; 429/234; 429/236; 29/623.5; 29/2; 252/62.3; 427/115
(58) Field of Search ................................. 429/208, 234, 429/236, 237; 29/2, 623.5; 252/62.3; 427/115

(56) References Cited

U.S. PATENT DOCUMENTS

| | | | |
|---|---|---|---|
| 4,824,746 A | 4/1989 | Bélanger et al. | |
| 5,415,948 A | * 5/1995 | Gauthier et al. | ............. 429/62 |
| 5,423,110 A | 6/1995 | Gauthier et al. | |
| 5,518,839 A | 5/1996 | Olsen | |
| 5,521,028 A | 5/1996 | Gauthier et al. | |
| 5,522,955 A | 6/1996 | Brodd | |
| 5,616,437 A | * 4/1997 | Gao | ........................... 429/245 |
| 6,060,175 A | 5/2000 | Swisher | |
| 6,077,623 A | 6/2000 | Grosvenor et al. | |
| 6,127,042 A | 10/2000 | Tamic | |
| 6,332,900 B1 | 12/2001 | Muffoletto et al. | |

FOREIGN PATENT DOCUMENTS

JP  09 120818  5/1997

OTHER PUBLICATIONS

"New materials for polymer electrolyte membrane fuel cell current collectors" By Hentall P. L. et al.; Journal of Power Sources, Elsevier Sequoia S.A. Lausanne, CH, vol. 80, No. 1–2, Jul. 1999; pp. 235–241, XP004172833; ISSN: 0378–7753.

* cited by examiner

Primary Examiner—Mark Ruthkosky

(57) ABSTRACT

A current collector for polymer electrolyte thin film electrochemical cells and an electrochemical generator is disclosed. The current collector comprises a polymer substrate support film having a thickness of between 1 and 15 microns; a conductive metallic layer having a thickness of less than 3 microns, coated by metal vapor deposition onto at least one surface of the polymer substrate film; and a protective metal or metal oxide layer deposited onto the conductive metallic layer, having a thickness of between 5 and 500 nanometer and being electronically conductive.

19 Claims, 3 Drawing Sheets

CURRENT COLLECTOR FOR POLYMER ELECTROCHEMICAL CELLS AND ELECTROCHEMICAL GENERATORS THEREOF

FIELD OF THE INVENTION

The present invention relates to polymer electrolyte batteries and, more particularly, to current collectors for use in polymer electrolyte batteries.

BACKGROUND OF THE INVENTION

Rechargeable batteries manufactured from laminates of solid polymer electrolytes and sheet-like electrodes display many advantages over conventional liquid electrolyte batteries. These advantages include: lower overall battery weight; higher power density; higher specific energy; and longer service life. In addition, they are more environmentally friendly since the danger of spilling toxic liquid into the environment is eliminated.

Solid polymer battery components generally include: positive electrodes (commonly referred to as cathodes); negative electrodes (commonly referred to as anodes); and an electrolyte separator which is capable of permitting ionic conductivity and which is sandwiched between the electrodes. Moreover, a current collector can also be associated with either one of the electrodes, especially the cathode.

In addition to acting as a mechanical support, the current collector also conducts the flow of electrons between the active material of the electrode and the battery terminals. Current collectors have a tendency to corrode or form an insulating film, which impairs the passage of electrons between the collector and the active material of the electrode, thereby increasing the internal resistance of the electrochemical cell and reducing power density and cycle life of such rechargeable batteries.

The current collector is also considered a passive component of the electrochemical cell because it normally does not generate energy. It simply provides a means for conducting the electrical current generated by the electrochemical cell. It is therefore advantageous to reduce the volume and weight of the current collector as much as possible.

Thus, there is a need for a relatively light and thin current collector which can better resist corrosion.

SUMMARY OF THE INVENTION

Under a first broad aspect, the invention seeks to provide a current collector for polymer electrolyte thin film electrochemical cells comprising:
a polymer support film having a thickness of between 1 and 15 microns;
a conductive metallic layer having a thickness of less than 3 microns, the conductive metallic layer coated by metal vapor deposition onto at least one surface of the polymer support film;
a protective metal or metal oxide layer deposited onto the conductive metallic layer, the protective metallic layer having a thickness of between 5 and 500 nanometers and being electronically conductive.

In one preferred embodiment, the polymer substrate support film is electrically conductive.

Under a second broad aspect, the invention also seeks to provide a rechargeable electrochemical generator comprising at least one thin-film electrochemical cell, said electrochemical cell comprising:
at least one thin-film solid electrolyte disposed between a film constituting an anode and a film constituting a cathode;
a current collector associated with one of the anode or cathode, the current collector comprising:
a polymer support film having a thickness of between 1 and 15 microns;
a conductive metallic layer having a thickness of less than 3 microns, the conductive metallic layer coated by metal vapor deposition onto at least one surface of the polymer support film;
a protective metal or metal oxide layer deposited onto the conductive metallic layer, the protective metallic layer having a thickness of between 5 and 500 nanometers and being electronically conductive.

Under a third broad aspect, the invention also seeks to provide a current collector for use in an electrochemical cell. The current collector comprises: a polymer support film, a conductive metallic layer, which is in contact with the polymer support film; and a protective metallic layer, which is in contact with the conductive metallic layer. The protective metallic layer is adapted to protect the conductive metallic layer against corrosion.

Advantageously, the electrochemical cells making up the rechargeable electrochemical generator are of bi-face configuration. Furthermore, the polymer substrate support film of the current collector is preferably electronically conductive.

BRIEF DESCRIPTION OF THE DRAWINGS

A detailed description of preferred embodiments of the present invention is provided herein below with reference to the following drawings, in which.

DETAILED DESCRIPTION

Figure 1:
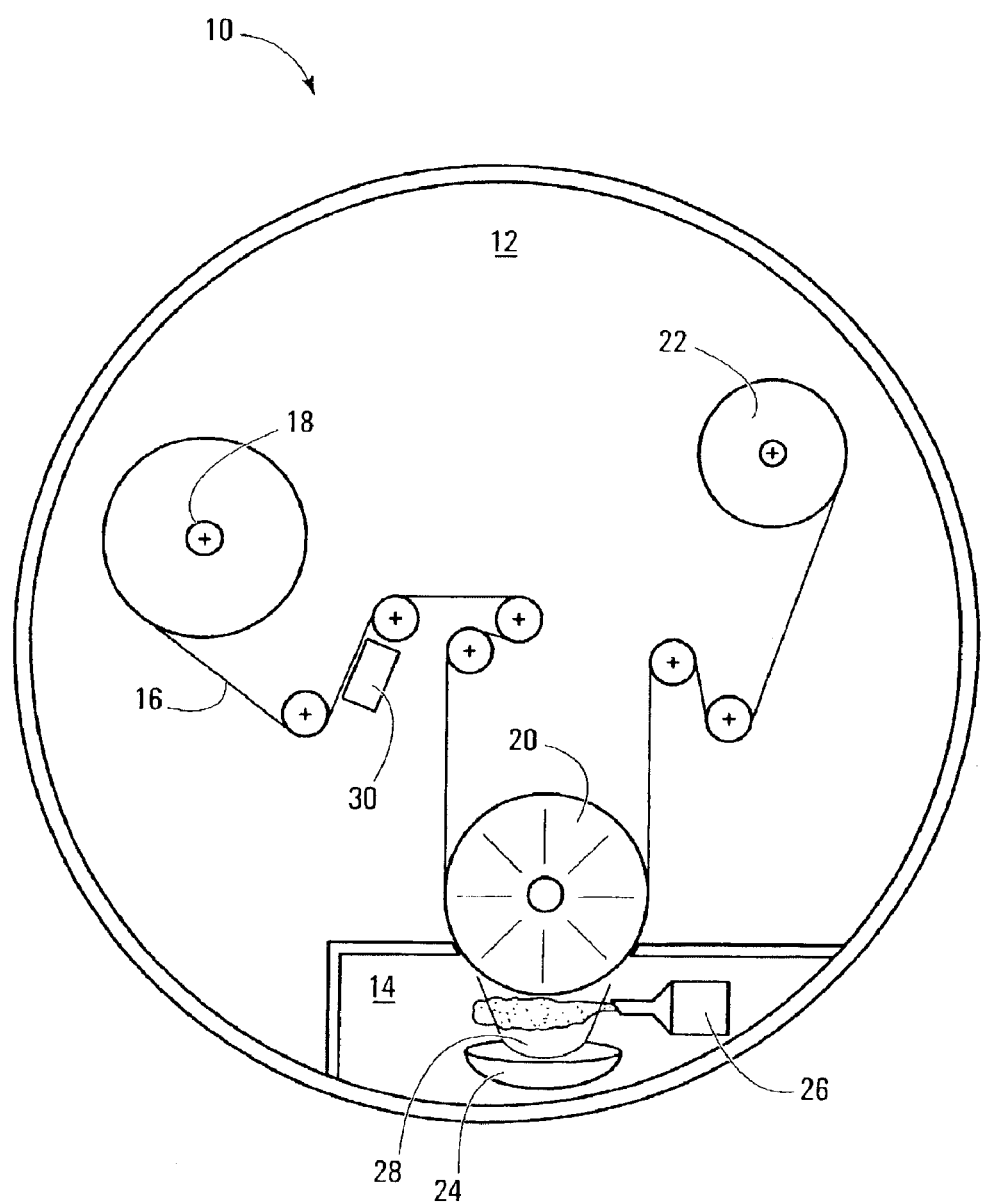
FIG. 1 is a schematic front view of a typical vacuum metal vapor deposition apparatus for metal coating a substrate film.

As previously mentioned, current collectors in electrochemical (EC) cells are passive components that transport currents generated by the chemical reaction between the anode and the cathode. Current collectors also act as mechanical supports for paste-like anodes or cathodes, and as such should be as strong and as thin as practicable to reduce the weight and volumetric penalty of the current collector to the overall weight and volume of the EC cell.

To achieve these goals, a current collector in accordance with one embodiment comprises a polymer support film having a thickness of between about 1 and 15 microns, preferably less than about 10 microns, onto which is deposited by vacuum evaporation a conductive metallic layer having a thickness of less than 3 microns, and preferably less than 1 micron. The conductive metallic layer is thereafter protected against corrosion by a protective metallic layer having a thickness of between about 5 and 500 nanometers, and preferably less than about 100 nanometers.

The polymer support film is selected for its relative thinness, its tensile strength, its low elongation, its ability to be metallized, and its stability over time. Polymer support films exhibiting acceptable properties can comprise bi-axially oriented polystyrene (BO-PS), polyethylene terephthalate (BO-PET), polycarbonate (PC), polypropylene (PP), polypropylene sulphide (PPS) and polyethylene naphthalate (PEN). Such polymer support films are readily available on the market in thickness ranging from 2 microns to 12 microns. They are also capable of withstanding the high temperature of metal evaporation deposition and plasma activated evaporation deposition. Finally, they display good tensile strength such that the metallized current collector may be processed in subsequent manufacturing steps to make electrochemical cells.

The conductive metallic layer may comprise any metal exhibiting good electrical and thermal conductivity, as well as low density and low cost. Suitable metals include aluminum (Al), copper (Cu), silver (Ag), nickel (Ni), tin (Sn) or alloys based on these metals. However, preferred metals are aluminum and copper for their low cost and good conductivity. The chosen metal may be vacuum vapor deposited or plasma activated deposited onto the polymer support film.

With respect to the protective layer, the latter is electronically conductive to allow movement of electrons between the electrode active material and the conductive metallic layer of the current collector. In addition, it also acts to prevent degradation through corrosion or passivation of the conductive metallic layer. This layer should be as thin as possible and serves as a barrier between the corrosion or passivation effect of the electrode material. The protective layer preferably contributes to the electronic conductivity of the current collector. The protective layer is preferably a second metallic or metal oxide layer deposited onto the conductive metallic layer. Metal vapor deposition is one available technique to achieve such a layer. Most metals are sufficiently conductive to allow easy electronic movement, however few are adapted to resist corrosion initiated by the salts present in electrochemical cells. Suitable metals comprise silver (Ag), gold (Au), palladium (Pd), platinum (Pt) and metal oxides derived from any suitable metal that can form stable electronically conductive oxides such as $SnO_2$, $CrO_3$, etc.

Suitable methods of depositing the conductive metallic layer in thicknesses sufficient to permit the draining of current densities (Imax/$cm^2$) generated by electrochemical cells of average or large sizes include vacuum vapor metallization and plasma activated evaporation deposition. Vacuum vapor metallization is a low pressure, high temperature (energy) process in which metal vapor is formed. Vacuum vapor metallization generally occurs in three basic modes. First, metal wire can be directed into a hot boat or other container at high temperatures and low pressures wherein the metal melt formed in the boat is converted into vapor. Secondly, electron beam excitation of a metal held at low pressure and approximately ambient temperature can cause the production of a pool of molten metal and a metal vapor. Thirdly, the induction heating of metal in a susceptor vessel can result in the production of useful quantities of metal vapor at low pressure.

FIG. 1 illustrates a vacuum vapor metallization chamber 10 which is split into two separate zones, namely a winding zone 12 and an evaporation zone 14. A roll of polymer support film 16 such as for example BO-PET, 6 μm thick, is loaded into position in the winding zone 12 whilst the chamber is open to atmosphere. The polymer support film 16 is loaded onto an unwinding roll 18, looped around a processing cooling drum 20, and wound onto a winding roll 22. Once the polymer support film 16 is loaded, the chamber is closed and then evacuated to remove air, water and any other unwanted gaseous substances that could interfere with the metallization process. When the evaporation zone 14 reaches the required operating pressure, usually below 1 Torr and preferably less than 200 mTorr, an array of evaporators or boats 24 located beneath cooling drum 20, is heated to produce a molten metal pool and metal vapor. The polymer support film 16 is unwound onto the processing cooling drum 20 and metal such as aluminum or copper is fed onto each evaporator 24. The molten metal vaporizes into the hot gas stream emerging from each evaporator and is thereafter condensed on the polymer support film 16 which is cooled by the cooling drum 20 thereby forming a thin metal layer. The processing temperature of the cooling drum 20 is about −15° C. to −30° C. which condenses the vaporized metal onto the polymer support film 16 and rapidly dissipates heat to prevent melt down of the polymer support film 16, ensuring integrity of the metallized film.

Plasma may be used to enhance activation of metal evaporation. As illustrated in FIG. 1, a plasma source 26 may be installed near the gas stream of evaporators 24. A gas, or combination of gases, is injected into vaporization zone 28 and ionized between two electrodes. The remaining liquid metal particles of the vaporized metal are completely vaporized, thereby yielding a denser and more even coating with the benefit that a lesser amount of metal is required to achieve a conductive layer for a given current density.

As shown, a surface treatment system 30 may also be used to treat the polymer support film 16 prior to metal deposition in the evaporation zone 14. Surface treatment is preferably done in the winding zone 12. Ionized gas is propelled onto the surface or surfaces of the polymer support film 16 to improve the adhesion of the metal coating onto the polymer support film 16 and to improve the consistency of the metallized film as a barrier against oxygen transmission. Surface treatment of the polymer support film 16 improves the density and consistency of the metallized film.

In order to achieve a coating thickness of over 1000 Å (0.1 μm), the deposition rate of vaporized metal must be relatively high and the speed of the polymer support film 16 should be slowed down proportionally. Heat build up within the polymer support film 16 is compensated by more efficient cooling and heat dissipation of the latter in order to prevent melt down.

As shown in tables 1 and 2 below, conductive metallic layers of aluminum and copper featuring thicknesses of less than about 3.0 μm were coated onto one side of a BO-PET plastic support film. The maximum resistivity, required for the conductive layer is about 0.2 Ω/square to drain the current density generated by medium to large electrochemical cells. The resistivity measured for the aluminum conductive layers were satisfactory from 0.39 μm upward and it may be extrapolated that a 0.3 μm thick layer would be adequate. The resistivity measured for the copper conductive layers were satisfactory for thickness of 0.51 μm upward. Persons skilled in the art will however understand that thicknesses other than those listed in the below tables may also be suitable.

TABLE 1

Conductive Metallic Layers of Al

| Sample Nos. | Evap. Rate (g/min) | Web speed (m/s) | Layer thickness (μm) | Resistivity (Ω/square) |
|---|---|---|---|---|
| 1 | 1.3 | 0.1 | 0.390 | 0.16 |
| 2 | 1.3 | 0.05 | 0.78 | 0.09 |
| 3 | 1.3 | 0.025 | 1.560 | 0.05 |
| 4 | 1.3 | 0.013 | 3.000 | 0.03 |
| 5 | 1.8 | 0.25 | 1.080 | 0.05 |
| 6 | 1.8 | 0.05 | 2.160 | 0.05 |
| 7 | 2.5 | 0.1 | 0.750 | 0.05 |
| 8 | 2.5 | 0.075 | 1.440 | 0.05 |

TABLE 2

Conductive Metallic Layers of Cu

| Sample Nos. | Evap. Rate (g/min) | Web speed (m/s) | Layer thickness (μm) | Resistivity (Ω/square) |
|---|---|---|---|---|
| 1 | 4.3 | 0.25 | 0.21 | 0.25 |
| 2 | 4.3 | 0.1 | 0.52 | 0.12 |
| 3 | 4.3 | 0.05 | 1.03 | 0.07 |
| 4 | 4.3 | 0.025 | 2.06 | 0.05 |
| 5 | 5.9 | 0.14 | 0.51 | 0.1 |
| 6 | 5.9 | 0.07 | 1.010 | 0.05 |

Once the conductive metallic layer is coated or deposited onto the polymer support film 16, the protective layer is then applied onto the conductive metallic layer to protect the latter from the corrosive and passivation effect of the cathodic or anodic materials to be later coated onto the current collector. Preferred methods of depositing the protective layer in thicknesses ranging from about 5 nm to about 500 nm, and preferably less than about 100 nm, is either thermal evaporation deposition and plasma activated evaporation deposition or metal sputtering coating, which is well known in the art. In one embodiment, the protective layer is composed of silver (Ag) and has a thickness in the range of 10–50 nm thick. As mentioned above, however, other suitable metals such as gold (Au), palladium (Pd), platinum (Pt), and metal oxides derived from any suitable metal that can form stable electronically conductive oxides such as $SnO_2$, $CrO_3$, may also be used.

Figure 2:
FIG. 2 is a schematic cross sectional view of a current collector in accordance with one embodiment of the invention.

FIG. 2 illustrates a current collector 40 fabricated in accordance with the above method. Current collector 40 comprises a polymer support film 42, a conductive metallic layer 44, and a protective layer 46.

Figure 3:
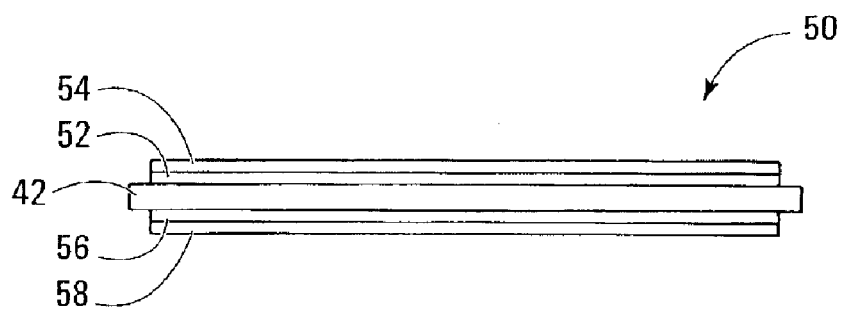
FIG. 3 is a schematic cross sectional view of a current collector in accordance with another embodiment of the invention.

Preferably, the polymer support film 42 is coated on both sides as illustrated in FIG. 3. As shown, the current collector 50 comprises a central polymer support film 42. In addition, current collector 50 also includes a first conductive metallic layer 52 and a first protective layer 54 on one side of the polymer support film 42, as well as a second conductive layer 56 and a second protective layer 58 on the other side thereof. A dual side current collector 50 as illustrated in FIG. 3 allows electrode materials to be coated on both of its sides, thereby reducing by half the weight and volume penalty of the polymer support film 42 in a battery.

To further increase the conductivity of the current collector and therefore reduce the required thickness of the conductive metallic layers 52 and 56, a conductive polymer support film may be used. A conductive polymer support film refers to any polymer support film which has been doped with a sufficient amount of a conductive material, so as to be conductive and therefore increase the overall conductivity of a current collector as described above. Advantageously, the increased conductivity may improve the processability of the polymer support film by increasing its thermal conductivity and therefore its ability to dissipate heat through the cooling drum of the vacuum metallization apparatus. Examples of particular polymers employed include polyesters, polycarbonates, polyacrylates, polyethylenes, polypropylenes and the like. These polymers are doped with a sufficient amount of a conductive material to render them conductive. Such conductive materials include, by way of example, carbon powder, graphite, powdered nickel, metal particles, and the like. Polymers characterized by a conjugated network of double bonds like polypyrol and polyacetylene may also be conductive and used as a polymer support film 42.

Figure 4:
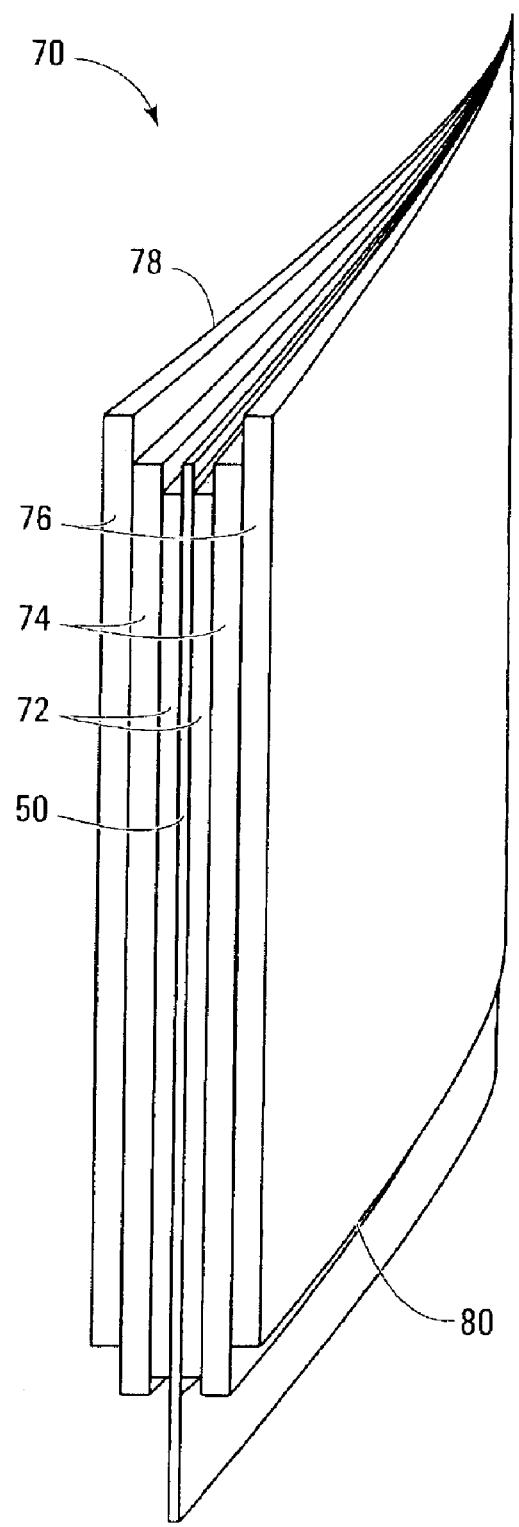
FIG. 4 is a schematic perspective view of an electrochemical cell incorporating a current collector in accordance with one embodiment of the invention.

FIG. 4 illustrates a typical embodiment of a solid-state state, thin-film electrochemical cell which may be utilized in the fabrication of a rechargeable electrochemical generator. Electrochemical cell 70 includes a central metallized dual side current collector 50 as described and illustrated in FIG. 3 (some details being omitted for the sake of clarity). A layer of cathode material 72 is coated or directly extruded onto each side of current collector 50. Electrochemical cell 70 is of bi-face flat prismatic configuration in which a thin-film solid electrolyte 74 is disposed between films 76 constituting anodes and the films 72 constituting the cathodes. A central cathode current collector 50 is disposed between each of the cathode films 72. The anode films 76 are laterally offset relative to the cathode current collector 50 so as to expose the anodes 76 along a first edge 78 of the cell 70, and to expose the current collector 50 along a second edge 80 of the cell 70. In accordance with one specific embodiment of an electrochemical cell 70, the anode films 76 are thin sheets of lithium or lithium alloy; the cathode films 72 are usually composites formed of a mixture of an active material such as transitional metal oxide, an electrically conductive filler, usually carbon particles and an ionically conductive polymer electrolyte material.

A mono-face cell configuration may alternatively be employed in which a one sided cathodic current collector 40, as shown in FIG. 2, is associated with a single anode/electrolyte/cathode element combination. In this configuration, an insulating film is typically disposed between individual anode/electrolyte/cathode/collector element combinations.

In accordance with one specific embodiment, and with further reference to FIG. 4, electrochemical cell 70 includes solid polymer electrolytes 74 which constitutes an ion transporting material, positioned between lithium metal anode films 76, and active vanadium oxide cathode films 72. These film elements are fabricated to form a thin-film laminated prismatic structure, which may include an insulation film such as polypropylene film between each electrochemical cell 70.

Thin-film electrochemical cells may also be packaged in a "jelly roll" configuration so as to form a generally cylindrical cell structure, a flat roll configuration, or a flat stack configuration. Such configurations are well known in the art.

Although various embodiments have been illustrated, this was for the purpose of describing, but not limiting, the invention. Various modifications will become apparent to those skilled in the art and are within the scope of this invention, which is defined more particularly by the attached claims.

We claim:

1. A current collector for polymer electrolyte thin film electrochemical cells comprising:
   a polymer support film having a thickness of between 1 and 15 microns;
   a conductive metallic layer having a thickness of less than 3 microns, said conductive metallic layer coated by metal vapor deposition onto at least one surface of said polymer support film;
   a protective metallic layer deposited onto said conductive metallic layer, said protective metallic layer having a thickness of between 5 and 500 nanometers and being electronically conductive.

2. A current collector as defined in claim 1 wherein said polymer support film is selected from the group consisting of polystyrene, polyethylene terephthalate, polycarbonate, polypropylene and polyamide.

3. A current collector as defined in claim 1 wherein said conductive metallic layer is selected from the group consisting of Al, Cd, Cu, Mg, Ni and Sn.

4. A current collector as defined in claim 1 wherein said protective metallic layer is selected from the group consisting of Ag, Pd, Pt, Sn and Cr.

5. A current collector as defined in claim 4 wherein said protective metallic layer is coated by sputtering onto said first metallic layer.

6. A current collector as defined in claim 1 wherein said protective metallic layer is a metal oxide layer.

7. A current collector as defined in claim 1 wherein said polymer support film is electronically conductive.

8. A current collector as defined in claim 7 wherein said polymer support film is made electronically conductive by doping with a sufficient amount of a conductive material so as to be conductive and increase the overall conductivity of said current collector.

9. A current collector as defined in claim 8 wherein conductive material is selected from the group consisting of carbon powder, graphite, powdered nickel and metal particles.

10. A current collector as defined in claim 7 wherein said polymer support film is a polymer having a conjugated network of double bonds.

11. A current collector as defined in claim 1 wherein said conductive metallic layer is coated onto at least one surface of said polymer support film by plasma activated vapor deposition.

12. A current collector as defined in claim 1 wherein said protective metallic layer is deposited by metal sputtering.

13. A current collector as defined in claim 1 wherein said conductive metallic layer is a first conductive metallic layer and said protective metallic layer is a first protective metallic layer, said current collector further comprising a second conductive metallic layer and a second protective metallic layer such as to form a dual side metallized current collector.

14. A rechargeable electrochemical generator comprising at least one thin-film electrochemical cell, said electrochemical cell comprising:
   at least one thin-film solid electrolyte disposed between a film constituting an anode and a film constituting a cathode;
   a current collector associated with one of said anode or cathode, said current collector comprising:
   i. a polymer support film having a thickness of between 1 and 15 microns;
   ii. a conductive metallic layer having a thickness of less than 3 microns, said conductive metallic layer coated by metal vapor deposition onto at least one surface of said polymer support film;
   iii. a protective metallic layer deposited onto said conductive metallic layer, said protective metallic layer having a thickness of between 5 and 500 nanometer and being electronically conductive.

15. A rechargeable electrochemical generator as defined in claim 14 wherein a plurality of thin-film electrochemical cells are stacked together.

16. A rechargeable electrochemical generator as defined in claim 15 wherein said electrochemical cells are of bi-face configuration.

17. A rechargeable electrochemical generator as defined in claim 14 wherein said polymer support film is electronically conductive.

18. A rechargeable electrochemical generator as defined in claim 14 wherein said conductive metallic layer is selected from the group consisting of Al, Cd, Cu, Mg, Ni and Sn.

19. A rechargeable electrochemical generator as defined in claim 14 wherein said protective metallic layer is selected from the group consisting of Ag, Pd, Pt, Sn and Cr.

* * * * *